United States Patent
Takayama

(10) Patent No.: US 11,303,762 B2
(45) Date of Patent: Apr. 12, 2022

(54) IMAGE INSPECTING APPARATUS, DISPLAY METHOD, AND COMPUTER PRODUCT DISPLAYING PSEUDO DEFECT IMAGE AT POSITION DIFFERENT FROM PRINTING ERROR

(71) Applicant: Ricoh Company, Ltd., Tokyo (JP)

(72) Inventor: Hiroshi Takayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/323,126

(22) Filed: May 18, 2021

(65) Prior Publication Data

US 2021/0385337 A1 Dec. 9, 2021

(30) Foreign Application Priority Data

Jun. 4, 2020 (JP) .............................. JP2020-097873

(51) Int. Cl.
*H04N 1/00* (2006.01)
*G06T 7/00* (2017.01)

(52) U.S. Cl.
CPC ......... *H04N 1/00005* (2013.01); *G06T 7/001* (2013.01); *G06T 7/0004* (2013.01); *H04N 1/00013* (2013.01); *H04N 1/00018* (2013.01); *H04N 1/00037* (2013.01); *H04N 1/0044* (2013.01); *H04N 1/00045* (2013.01); *H04N 1/00068* (2013.01); *H04N 1/00076* (2013.01)

(58) Field of Classification Search
None
See application file for complete search history.

(56) References Cited

U.S. PATENT DOCUMENTS

| | | | |
|---|---|---|---|
| 8,223,385 B2* | 7/2012 | Minhas | H04N 1/00031 358/1.18 |
| 9,189,845 B2* | 11/2015 | Sochi | G06T 7/001 |
| 2012/0162649 A1 | 6/2012 | Ishizaki et al. | |
| 2013/0016374 A1 | 1/2013 | Kawamoto et al. | |
| 2013/0044342 A1 | 2/2013 | Kaneko et al. | |
| 2013/0250319 A1 | 9/2013 | Kaneko et al. | |
| 2013/0250369 A1 | 9/2013 | Kitai et al. | |

(Continued)

FOREIGN PATENT DOCUMENTS

| | | |
|---|---|---|
| JP | 2017-202627 | 11/2017 |
| JP | 2018-032410 | 3/2018 |
| JP | 2018-036279 | 3/2018 |

*Primary Examiner* — Scott A Rogers
(74) *Attorney, Agent, or Firm* — Xsensus LLP

(57) ABSTRACT

An image inspecting apparatus includes circuitry. The circuitry is configured to determine, based on a result of comparison of scanned image data and sample image data, whether an image indicated by the scanned image data has a printing error, the scanned image data being generated from a document image formed and output according to document image data on a recording medium and read, the sample image data corresponding to the document image data. The circuitry is configured to generate display image data representing a pseudo defect image having the printing error added to a position different from a position of the printing error in the image indicated by the scanned image data, in response to determination that the image indicated by the scanned image data has the printing error.

18 Claims, 9 Drawing Sheets

(56) References Cited

U.S. PATENT DOCUMENTS

| | | |
|---|---|---|
| 2013/0250370 A1 | 9/2013 | Kojima et al. |
| 2013/0250377 A1 | 9/2013 | Kitai et al. |
| 2013/0250378 A1 | 9/2013 | Kitai et al. |
| 2014/0036290 A1 | 2/2014 | Miyagawa et al. |
| 2014/0079292 A1 | 3/2014 | Kaneko et al. |
| 2014/0079293 A1 | 3/2014 | Kitai et al. |
| 2014/0268259 A1 | 9/2014 | Kitai |
| 2014/0268260 A1 | 9/2014 | Kitai et al. |
| 2014/0313538 A1 | 10/2014 | Kitai et al. |
| 2015/0063654 A1 | 3/2015 | Kitai |
| 2015/0269719 A1 | 9/2015 | Kitai |
| 2017/0031636 A1 | 2/2017 | Kitai |

* cited by examiner

FIG. 5

| No. | DEFECT IMAGE | DEFECT TYPE | DEFECT SCORE |
|---|---|---|---|
| 1 | FIRST DEFECT IMAGE | POINT-LIKE DEFECT | E1 |
| 2 | SECOND DEFECT IMAGE | LINEAR DEFECT | E2 |
| 3 | THIRD DEFECT IMAGE | POINT-LIKE DEFECT | E3 |
| ⋮ | ⋮ | ⋮ | ⋮ |

FIG. 7
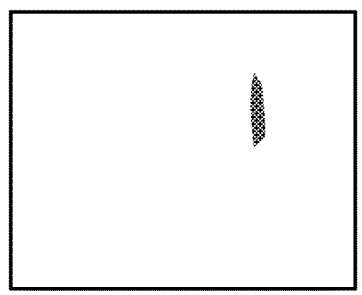
PSEUDO DEFECT DIFFERENCE
IMAGE OF FIRST AREA
· CONVERT RESOLUTION
· ADD DOCUMENT IMAGE
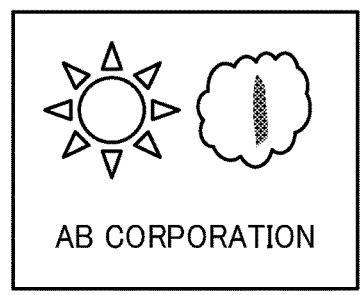
PSEUDO DEFECT
IMAGE OF FIRST AREA
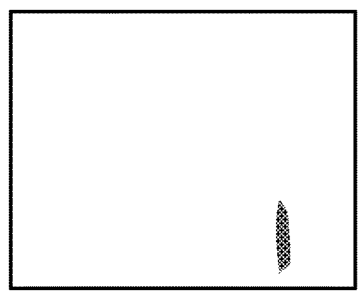
PSEUDO DEFECT DIFFERENCE
IMAGE OF SECOND AREA
· CONVERT RESOLUTION
· ADD DOCUMENT IMAGE
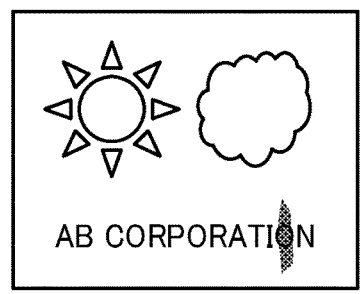
PSEUDO DEFECT
IMAGE OF SECOND AREA

IMAGE INSPECTING APPARATUS, DISPLAY METHOD, AND COMPUTER PRODUCT DISPLAYING PSEUDO DEFECT IMAGE AT POSITION DIFFERENT FROM PRINTING ERROR

CROSS-REFERENCE TO RELATED APPLICATION

This patent application is based on and claims priority pursuant to 35 U.S.C. § 119(a) to Japanese Patent Application No. 2020-097873, filed on Jun. 4, 2020, in the Japan Patent Office, the entire disclosure of which is hereby incorporated by reference herein.

BACKGROUND

Technical Field

Embodiments of the present disclosure relate to an image inspecting apparatus, a display method, and a non-transitory computer-readable storage medium storing program code that causes a computer to perform the display method.

Related Art

There is a typical technique for comparing a scanned image that is obtained from a read printed matter with a comparison target image to detect an image failure of the printed matter. Specifically, the image failure of the printed matter is detected by comparing, with a 2.0 threshold, a pixel value of a difference image indicating a difference between the scanned image and the comparison target image. As the comparison target image, for example, an original image or a document image serving as a source of the printed matter or an image generated from the document image may be used.

Relatedly, for the purpose of easily confirming whether a generated image failure is acceptable, there is a technique for generating, when the image failure of a printed matter is detected, a single sheet of failure detection report including a scanned image from which the image failure is detected and a document image (as a comparison target image). In a case in which the generated image failure is acceptable, a threshold related to detection of image failures is changed. Such a change allows an image to be formed and output (or printed) 3.0 with an image quality required by a user.

SUMMARY

In one embodiment of the present disclosure, a novel image inspecting apparatus includes circuitry. The circuitry is configured to determine, based on a result of comparison 3.5 of scanned image data and sample image data, whether an image indicated by the scanned image data has a printing error, the scanned image data being generated from a document image formed and output according to document image data on a recording medium and read, the sample image data corresponding to the document image data. The circuitry is configured to generate display image data representing a pseudo defect image having the printing error added to a position different from a position of the printing error in the image indicated by the scanned image data, in response to determination that the image indicated by the scanned image data has the printing error.

Also described are novel display method and non-transitory, computer-readable storage medium storing computer-readable program code that causes a computer to perform the display method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is an illustration of evaluation of defect images in an image inspecting apparatus according to an embodiment;

FIG. 7 is an illustration of pseudo defect images generated in an image inspecting apparatus according to an embodiment;

Figure 1:
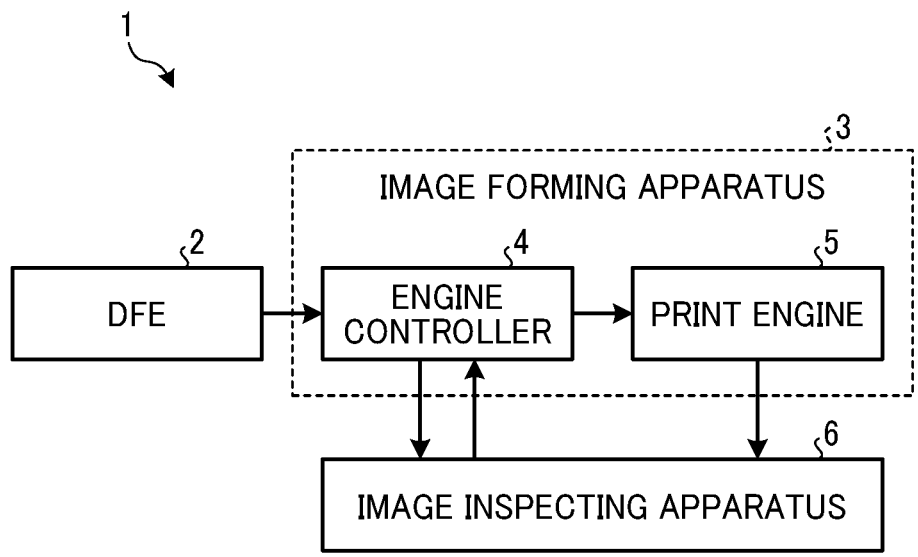
FIG. 1 is a block diagram of a configuration of an image forming system including an image inspecting apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

Referring to the drawings, wherein like reference numerals designate identical or corresponding parts throughout the several views, embodiments of the present disclosure are described below. The technique according to the embodiments of the present disclosure is not limited to an electrophotographic system. The technique according to the embodiments of the present disclosure is also applicable to an ink jet system.

FIG. 1 is a block diagram of a configuration of an image forming system 1 including an image inspecting apparatus 6 according to an embodiment of the present disclosure.

As illustrated in FIG. 1, the image forming system 1 according to the present embodiment includes a digital front end (DFE) 2, an image forming apparatus 3, and the image inspecting apparatus 6.

In the present embodiment, a description is given of some processes performed in the image forming system 1 to allow a user to make an acceptability determination with an enhanced accuracy. Here, the image forming system 1 according to the present embodiment is an image forming system including the image inspecting apparatus 6, which compares, with a master image (as a sample image), a scanned image (as a read image) obtained from a read output result to inspect the output result. Note that the output result is an image formed and output and herein referred to as an original image or a document image. In the image forming system 1 according to the present embodiment, when a defect is detected from the output result as a result of comparison, a pseudo defect image is presented to a user as a material for acceptability determination, that is, a material for determining whether the detected defect is acceptable. The image forming system 1 according to the present embodiment is configured to relax a threshold related to detection of image failures (such as printing errors or defects) when the user selects "acceptable."

The DFE 2 generates image data to be printed out, that is, bitmap data as an output target image, according to a print job received from a host device. The DFE 2 outputs the generated bit map data to an engine controller 4. An information processing device such as a general personal computer (PC) or server may be used as appropriate as the host device.

The image forming apparatus 3 executes image formation and output. In other words, the image forming apparatus 3 forms an image on a recording medium. The image forming apparatus 3 includes the engine controller 4 and a print engine 5.

The engine controller 4 causes the print engine 5 to form and output an image according to the bitmap data (as document image data) received from the DFE 2. On the other hand, the engine controller 4 transmits the bit map data received from the DFE 2 to the image inspecting apparatus 6 as information serving as a source of an image for inspection (such as sample image data or master image data). Here, the image for inspection is an image that the image inspecting apparatus 6 refers to when inspecting a result of image formation and output performed by the print engine 5. The engine controller 4 transmits information for identifying areas on an image indicated by the bit map data to the image inspecting apparatus 6 as information for generating a pseudo defect image. A detailed description of the pseudo defect image is deferred.

The engine controller 4 causes the print engine 5 to form and output an image according to the bitmap data on a sheet of paper serving as a recording medium and input, to the image inspecting apparatus 6, scanned image data generated from the output sheet read by a reading device. In addition to the sheet of paper described above, a sheet-like material on which an image can be formed and output may be used as the recording medium, such as a film or a plastic sheet.

According to the bitmap data input from the engine controller 4, the image inspecting apparatus 6 generates master image data (as sample image data) indicating a master image (as a sample image) to be compared with a scanned image. Then, the image inspecting apparatus 6 compares the scanned image input from the print engine 5 with the master image to inspect an output result (i.e., a document image).

The image inspecting apparatus 6 compares the scanned image input from the print engine 5 with the master image and may detect a defect on the scanned image. After detecting the defect (i.e., the printing error), the image inspecting apparatus 6 generates and outputs a pseudo defect image having a defect equivalent to the detected defect generated in a pseudo manner in each area on the image. The user may input, to the image inspecting apparatus 6, the determination as to whether the defect is acceptable. When the user determines that the defect is acceptable, the image inspecting apparatus 6 relaxes a threshold for subsequent detection of defects so that the inspection result does not indicate the presence of a defect when a similar defect occurs thereafter.

Figure 2:
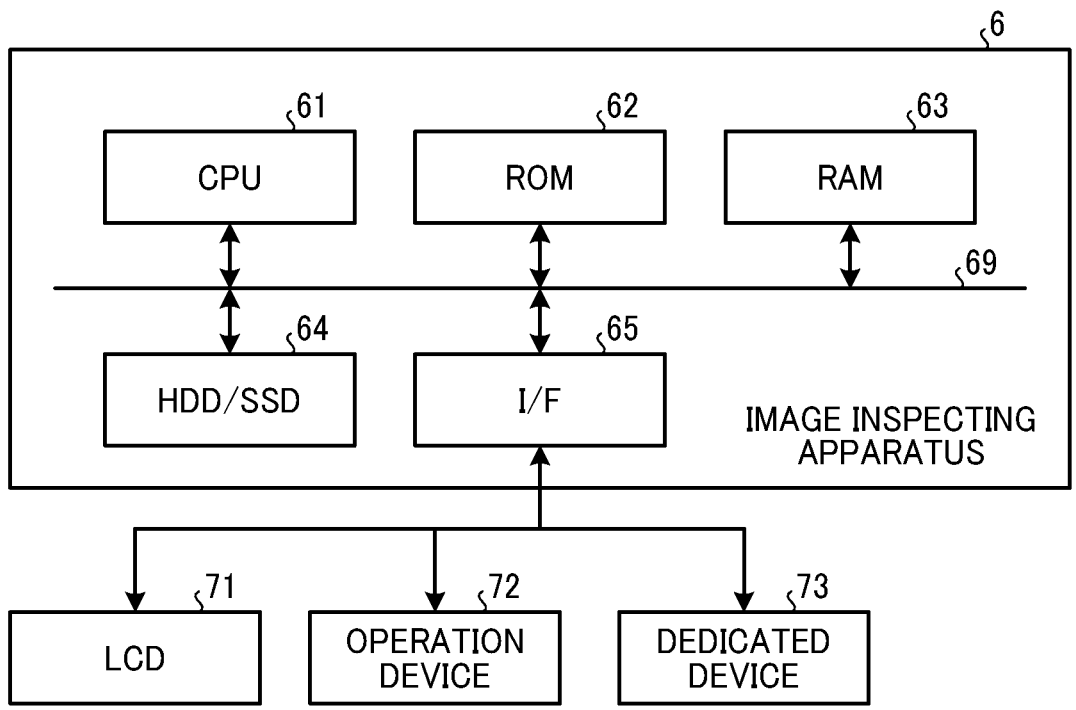
FIG. 2 is a block diagram of a hardware configuration of an image inspecting apparatus according to an embodiment.

Referring now to FIG. 2, a description is given of a hardware configuration of the components of the image forming system 1 (namely, the DFE 2, the engine controller 4, the print engine 5, and the image inspecting apparatus 6) according to an embodiment.

FIG. 2 is a block diagram of a hardware configuration of the image inspecting apparatus 6 according to an embodiment.

Although a description is mainly given of the hardware configuration of the image inspecting apparatus 6 with reference to FIG. 2, the DFE 2, the engine controller 4, and the print engine 5 have substantially the same hardware configurations as the hardware configuration of the image inspecting apparatus 6.

Note that at least two of the components of the image forming system 1 (namely, the DFE 2, the engine controller 4, the print engine 5, and the image inspecting apparatus 6) may be configured as an integrated apparatus. As an example, the engine controller 4 and the print engine 5 may configure a single, integrated apparatus serving as the image forming apparatus 3. The integrated apparatus has substantially the same hardware configuration as the hardware configuration of the image inspecting apparatus 6 described below.

The image inspecting apparatus 6 has substantially the same hardware configuration as a hardware configuration of an information processing apparatus such as a general PC or server. As an example, as illustrated in FIG. 2, the image inspecting apparatus 6 includes a central processing unit (CPU) 61, a read only memory (ROM) 62, a random access memory (RAM) 63, a hard disk drive/solid state drive (HDD/SSD) 64, and an interface (I/F) 65. The CPU 61, the ROM 62, the RAM 63, the HDD/SSD 64, and the I/F 65 are communicably connected to each other via a bus 69, for example.

The CPU 61 is a calculator or a processor. The CPU 61 controls the entire operation of the image inspecting apparatus 6. The ROM 62 is a read-only non-volatile storage medium. The ROM 62 stores programs such as firmware. The RAM 63 is a volatile storage medium capable of reading and writing information at high speed. The RAM 63 is used as a work area for the CPU 61 to process (or calculate) information. The HDD/SSD 64 is a non-volatile storage medium capable of reading and writing information. The HDD/SSD 64 stores, e.g., an operating system (OS), various control programs, and application programs.

Note that, instead of the CPU 61, various calculators or processors may be used as appropriate. For example, a graphics processing unit (GPU), an application-specific integrated circuit (ASIC), or a field-programmable gate array (FPGA) may be used.

Note that the HDD/SSD 64 may be at least one of an HDD and an SSD. Alternatively, another storage device may be used as appropriate as the HDD/SSD 64. For example, a flash memory or a compact disc read-only memory (CD-ROM) may be used as the HDD/SSD 64.

The I/F 65 is an interface circuit that connects the bus 69 to various kinds of hardware components or a network and controls the connection (i.e., the communication). In the example illustrated in FIG. 2, a liquid-crystal display (LCD) 71, an operation device 72, and a dedicated device 73 are connected to the I/F 65.

The LCD 71 is a visual user interface (serving as a display device) for a user to confirm the state of the image inspecting apparatus 6. The operation device 72 is a user interface (serving as an input device) for a user to input information to the image inspecting apparatus 6, such as a keyboard or a mouse. The LCD 71 and the operation device 72 may be integrated as a touch panel display. Here, the LCD 71 is an example of a display.

The dedicated device 73 is a hardware component that implements a dedicated function in each of the engine controller 4, the print engine 5, and the image inspecting apparatus 6. In the case of the print engine 5, examples of the dedicated device 73 include, but are not limited to, a plotter that forms and outputs an image on a recording medium and a reading device that reads the image output on the recording medium. In the case of the engine controller 4 or the image inspecting apparatus 6, the dedicated device 73 is an arithmetic device dedicated to high-speed image processing. Such an arithmetic device is configured as an ASIC, for example.

In such a hardware configuration, the CPU 61 reads a program from a storage medium such as the ROM 62, the HDD/SSD 64, or an optical disk and loads the program into the RAM 63. The CPU 61 executes calculation according to the program loaded into the RAM 63, thus functioning as a software controller. A combination of the software controller and the hardware configures functional blocks to implement respective functions of the engine controller 4, the print engine 5, and the image inspecting apparatus 6 according to the present embodiment.

Note that a control program executed by each of the components of the image forming system 1 (namely, the DFE 2, the engine controller 4, the print engine 5, and the image inspecting apparatus 6) of the present embodiment is stored in a computer-readable storage medium in an installable or executable file format and provided. Examples of the computer-readable storage medium include, but are not limited to, a CD-ROM, a flexible disk (FD), a compact disc recordable (CD-R), and a digital versatile disk (DVD).

Alternatively, the control program executed by each of the components of the image forming system 1 (namely, the DFE 2, the engine controller 4, the print engine 5, and the image inspecting apparatus 6) of the present embodiment may be stored on a computer connected to a network such as the Internet and downloaded via the network, to be provided. The control program executed by each of the components of the image forming system 1 (namely, the DFE 2, the engine controller 4, the print engine 5, and the image inspecting apparatus 6) of the present embodiment may be provided or distributed via a network such as the Internet.

Alternatively, the control program executed by each of the components of the image forming system 1 (namely, the DFE 2, the engine controller 4, the print engine 5, and the image inspecting apparatus 6) of the present embodiment may be incorporated in, e.g., a ROM in advance and provided.

Figure 3:
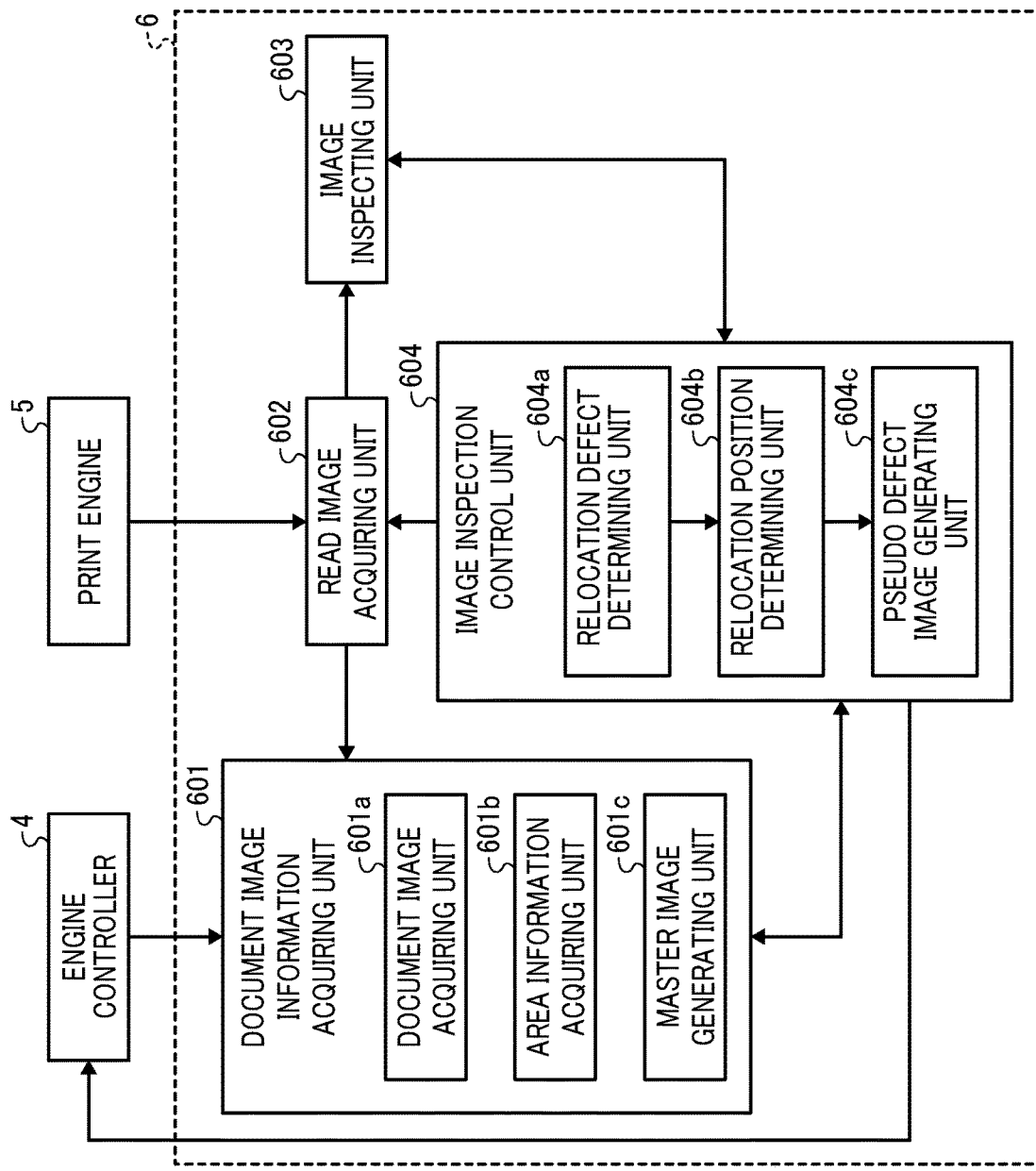
FIG. 3 is a block diagram of a functional configuration of an image inspecting apparatus according to an embodiment.

FIG. 3 is a block diagram of a functional configuration of the image inspecting apparatus 6 according to an embodiment.

As illustrated in FIG. 3, the image inspecting apparatus 6 implements functions as a document image information acquiring unit 601, a read image acquiring unit 602, an image inspecting unit 603, and an image inspection control unit 604. Here, the read image acquiring unit 602 is an example of an acquiring unit. The image inspecting unit 603 is an example of a determining unit. The image inspection control unit 604 is an example of a generating unit and an updating unit.

Specifically, the control program executed by the image inspecting apparatus 6 according to the embodiment has a module configuration including the components described above (namely, the document image information acquiring unit 601, the read image acquiring unit 602, the image inspecting unit 603, and the image inspection control unit 604). As actual hardware, the CPU 61 (i.e., the processor) reads the control program from the storage medium described above (e.g., the ROM 62 or the HDD/SSD 64) and executes the control program, thus loading and generating the functional units described above (namely, the document image information acquiring unit 601, the read image acquiring unit 602, the image inspecting unit 603, and the image inspection control unit 604) on a main storage device (i.e., the RAM 63).

The document image information acquiring unit 601 receives, from the engine controller 4, information (as document image information) including a document image and area information that is used to identify areas on the document image. As illustrated in FIG. 3, the document image information acquiring unit 601 includes functions as a document image acquiring unit 601*a*, an area information acquiring unit 601*b*, and a master image generating unit 601*c*.

The document image acquiring unit 601*a* acquires the document image from the document image information received from the engine controller 4.

The area information acquiring unit 601*b* acquires the area information from the document image information received from the engine controller 4.

The master image generating unit 601*c* generates an image (as a master image) in a format comparable with a scanned image, from the document image acquired by the document image acquiring unit 601*a*. Specifically, the master image generating unit 601*c* changes the resolution of the document image according to the resolution of the scanned image. Therefore, in a case in which the resolution of the scanned image is about the same as the resolution of the document image, the document image may be used as the master image.

In the present embodiment, the area information (i.e., the information that is used to identify areas on the document image) is received from the engine controller 4. Alternatively, the document image information acquiring unit 601 may acquire the area information from the image inspection control unit 604 or may automatically acquire the area information of the document image by area segmentation.

The read image acquiring unit 602 acquires a scanned image (as a read image) obtained by the reading device (i.e., the dedicated device 73) of the print engine 5.

The image inspecting unit 603 acquires a difference image indicating a difference between the scanned image and the master image. The image inspecting unit 603 compares the obtained difference image with a threshold for image inspection to detect a defect (i.e., a printing error) of the scanned image. Here, the defect of the scanned image corresponds to a defect of a printed matter resulting from the image formation and output performed by the image forming apparatus 3.

From the scanned image including defect images constructed of defect pixels detected, the image inspecting unit 603 acquires defect information including the respective positions of the defect pixels of the defect image on the scanned image and respective difference values at the defect pixels. The image inspecting unit 603 divides the defective pixels into groups, as defective images, according to the position on the scanned image. That is, the image inspecting unit 603 groups the defective pixels according to the position on the scanned image to specify defective images. In other words, the image inspecting unit 603 recognizes defect images at distant positions as different defect images.

Figure 4:
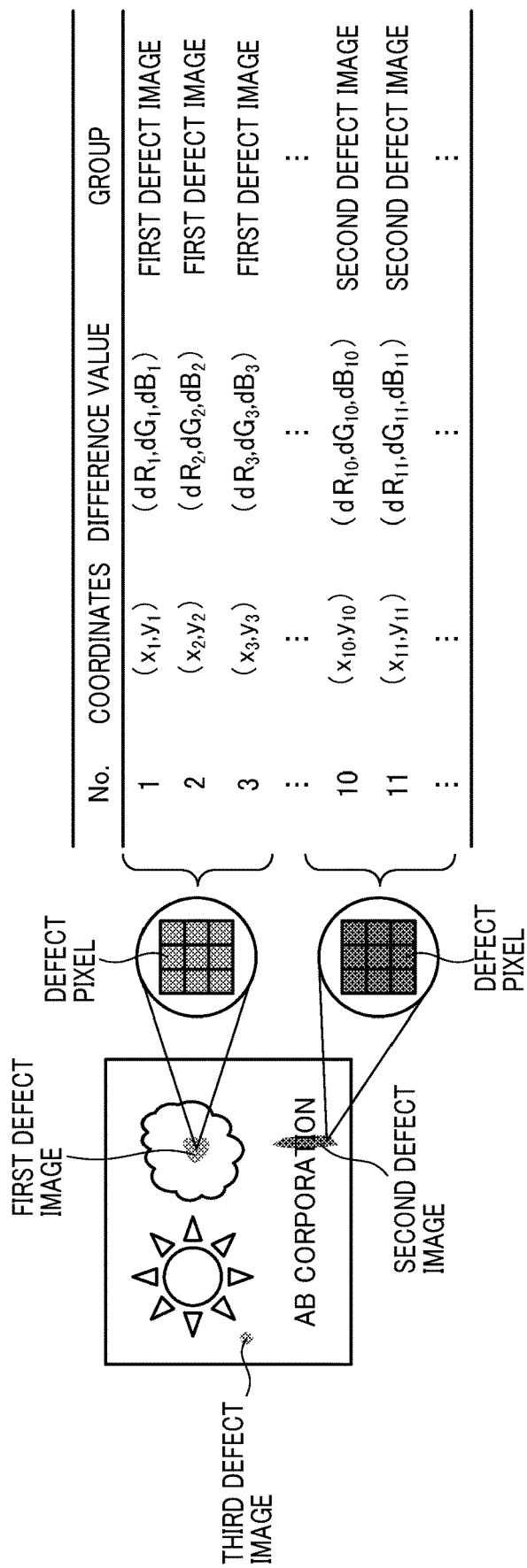
FIG. 4 is an illustration of defect information on defect images detected in an image inspecting apparatus according to the embodiment.

FIG. 4 is an illustration of defect information on defect images detected in the image inspecting apparatus 6 according to an embodiment.

FIG. 4 illustrates defect images as three groups, namely, a first defect image, a second defect image, and a third defect image. In the example illustrated in FIG. 4, the first defect image is a defect image generated in a picture area. The second defect image is a defect image generated in a text area. The third defect image is a defect image generated in a blank area. Here, the picture area refers to an area in which an image representing, e.g., a photograph or a figure is formed. The text area refers to an area in which an image representing, e.g., text is formed. The blank area is, e.g., an area on a recording medium in which the image forming apparatus 3 can form and output an image. The blank area is an area other than the picture area and the text area.

As described above, the image inspecting unit 603 compares a distance between the defect pixels with a threshold for searching for a defect range. When the distance between the defect pixels is equal to or less than the threshold, the image inspecting unit 603 recognizes that the defective pixels construct the same defect image. By contrast, when the distance between the defect pixels exceeds the threshold, the image inspecting unit 603 recognizes that the defect pixels are part of different defect images. That is, as illustrated in FIG. 4, the defect information includes information on each defect image as a group.

The image inspecting unit 603 calculates a feature or attribute for each defect image and determines a defect type based on the calculated feature or attribute. In addition, based on the calculated feature or attribute, the image inspecting unit 603 calculates a defect score indicating the degree of defect for each defect image.

FIG. 5 is an illustration of evaluation of defect images detected in the image inspecting apparatus 6 according to an embodiment.

In the image inspecting apparatus 6, a plurality of defect types and a formula for calculating the defect score are predefined and stored in the HDD/SSD 64, for example.

For example, as in the first defect image and the third defect image in FIG. 4, in a case in which the difference between the vertical length and the lateral length of the defect is relatively small, the image inspecting unit 603 determines that the defect image is a point-like defect. For example, as in the second defect image of FIG. 4, in a case in which the area of the defect is large to some extent and the difference between the vertical length and the lateral length is relatively large, the image inspecting unit 603 determines that the defect image is a linear defect. Note that, as the vertical length (and the lateral length) of the defect, the length on the printed matter may be used. Alternatively, the number of pixels constructing the defect image may be used. As described above, in the image inspecting apparatus 6 according to the embodiment, the image inspecting unit 603 obtains the feature or attribute of the detected defect image and selects one of the predefined detect types based on the obtained feature or attribute.

Thereafter, as illustrated in FIG. 5, the image inspecting unit 603 calculates the defect score indicating the degree of defect for each defect image. As the formula for calculating the defect score, for example, a formula for calculating, as the defect score, an area of the defect image or a maximum difference value of the defect pixels constructing the defect image may be used as appropriate. Alternatively, a method for calculating the defect score may be determined for each defect type. For example, the length of a line may be determined as the defect score for a linear defect. The area of a line may be determined as the defect score for a point-like defect Instead of using the formula, the defect score may be obtained by referring to a preset lookup table stored in the HDD/SSD 64, for example.

Although FIG. 5 illustrates two defect types, that is, a point-like defect and a linear defect, the defect types are not limited to the point-like defect and the linear defect. The defect types may include defect types different from the point-like defect and the linear defect. The number of defect types is not limited to two. Alternatively, the number of defect types may be one, or three or more.

Referring back to FIG. 3, the image inspection control unit 604 includes a relocation defect determining unit 604a, a relocation position determining unit 604b, and a pseudo defect image generating unit 604c. The relocation defect determining unit 604a selects a defect image having a high defect score as a defect to be relocated in each area on the image. Note that the relocation defect determining unit 604a may select the defect to be relocated for each defect type. The relocation defect determining unit 604a may select all of the detected defect images as defects to be relocated, not limited to defects having a high defect score, in order to provide a material for more accurate acceptability determination, although such acceptability determination takes time and effort and therefore reduces the efficiency.

The relocation position determining unit 604b determines, as a destination of relocation, a relocation position of the selected defect.

Figure 6:
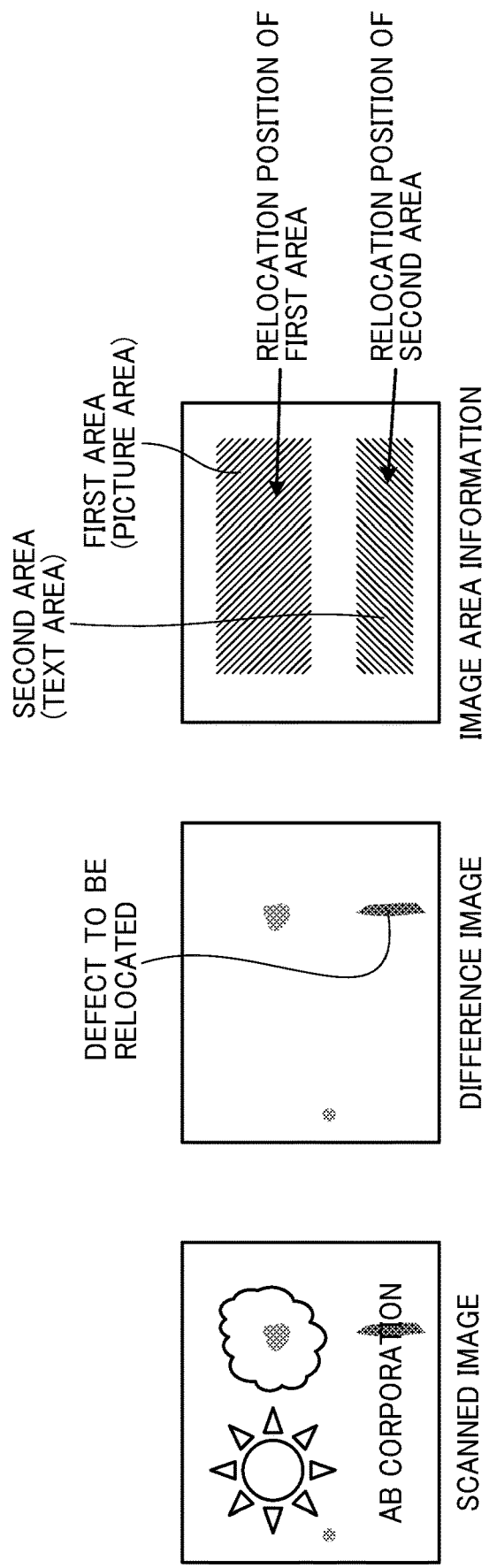
FIG. 6 is an illustration of determination of a relocation position in an image inspecting apparatus according to an embodiment.

FIG. 6 is an illustration of determination of a relocation position in the image inspecting apparatus 6 according to an embodiment.

As an example, based on the area information, the relocation position determining unit 604b relocates a defect image in an area different from an area from which a defect is detected in a scanned image. For example, as illustrated in FIG. 6, the relocation position determining unit 604b determines to relocate, in a first area as a picture area, a defect image detected from a second area as a text area of the scanned image. As another example, the relocation position determining unit 604b relocates the defect image in the same area as the area from which the defect is detected in the scanned image. For example, as illustrated in FIG. 6, the relocation position determining unit 604b determines to relocate, in the second area (i.e., the text area), the defect image detected from the second area (i.e., the text area) of the scanned image by moving the defect image in parallel in a sub-scanning direction, for example. Note that the detected defect may be relocated in each area on the image or may be relocated in at least one area. The relocation position determining unit 604b determines at which position on each area the defect is to be relocated. That is, the relocation position determining unit 604b determines the relocation position. As an example, the relocation position determining unit 604b determines the relocation destination, for each area, of the defect image at random provided that the area includes a maximum number of pixels of the defect image to be relocated. As another example, the relocation position determining unit 604b determines a relocation destination, for each area, of the defect image based on at least one of, e.g., the position, type, and difference value of the defect generated. As yet another example, the relocation position determining unit 604b relocates the defect image to a preset position.

The pseudo defect image generating unit 604c generates a pseudo defect image.

FIG. 7 is an illustration of pseudo defect images generated in the image inspecting apparatus 6 according to an embodiment.

As illustrated in FIG. 7, the pseudo defect image generating unit 604c moves the defect image determined by the relocation defect determining unit 604a to the relocation position determined by the relocation position determining unit 604b to generate a pseudo defect difference image. As illustrated in FIG. 7, the pseudo defect image generating unit 604c adds a document image to the pseudo defect difference image, to generate a pseudo defect image. Here, in a case in which the resolution of the pseudo defect difference image is different from the resolution of the document image, the pseudo defect image generating unit 604c converts the resolution of the pseudo defect difference image, so as to add each pixel. Thus, for each detect determined by the relocation defect determining unit 604a to be relocated, the pseudo defect image generating unit 604c generates pseudo defect images for the number of relocation positions.

In the present embodiment, the document image is used to generate the pseudo defect images. Alternatively, a master image or a scanned image may be used to generate the pseudo defect images. The pseudo defect image generating unit 604c may convert the resolution of an image to which the pseudo defect difference image is added, so as to conform to the resolution of the pseudo defect difference image.

The image inspection control unit 604 outputs the pseudo defect image thus generated as a material for a user to determine whether to change a threshold. The output pseudo defect image is displayed on the LCD 71 and thus presented to the user.

Figure 8:
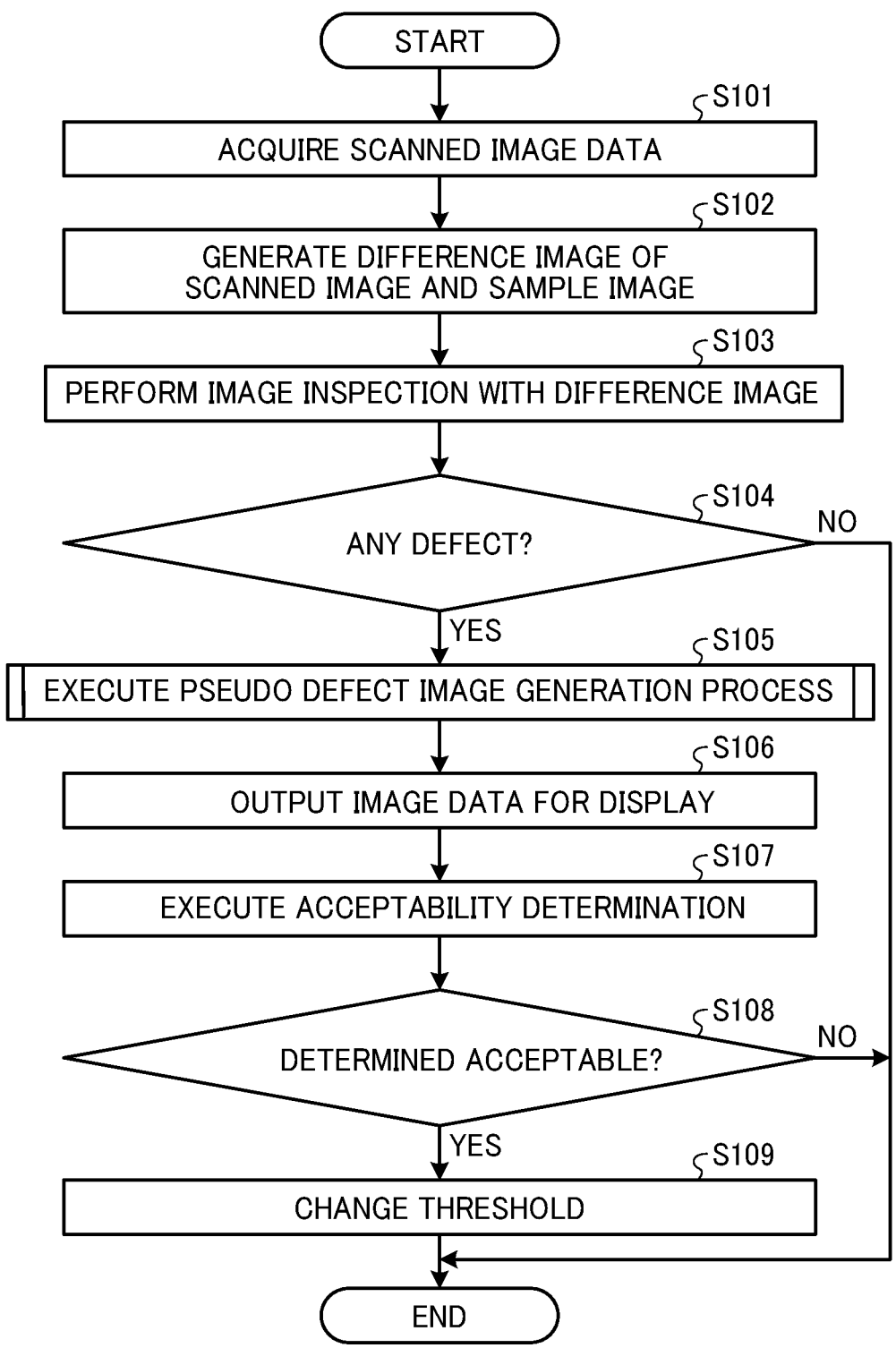
FIG. 8 is a flowchart of an image inspection process executed in an image inspecting apparatus according to an embodiment.
Figure 9:
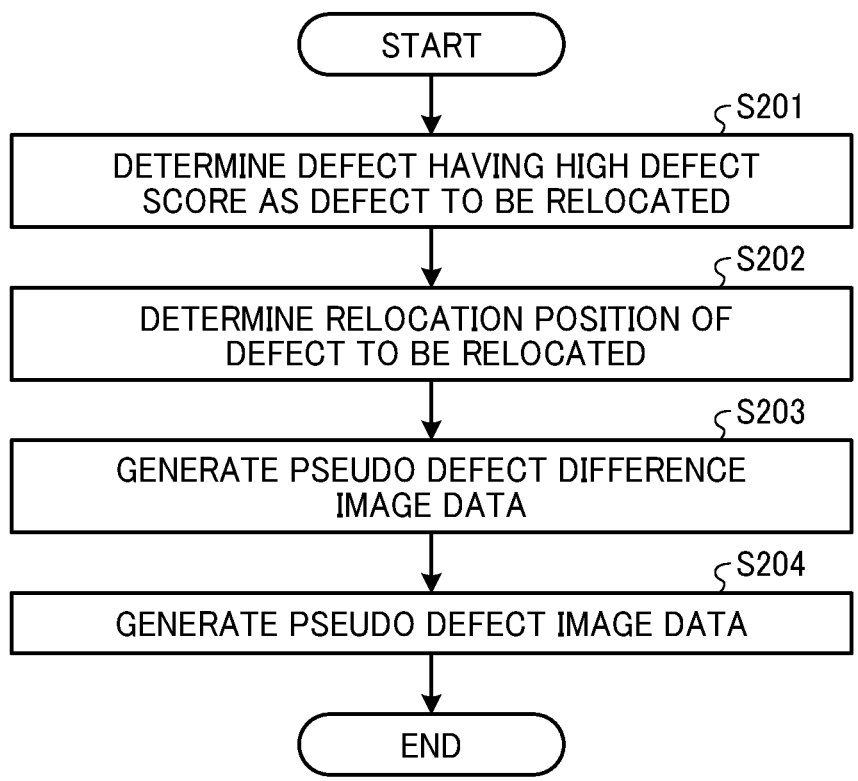
FIG. 9 is a flowchart of a pseudo defect image generation process executed in an image inspecting apparatus according to an embodiment.
Figure 10:
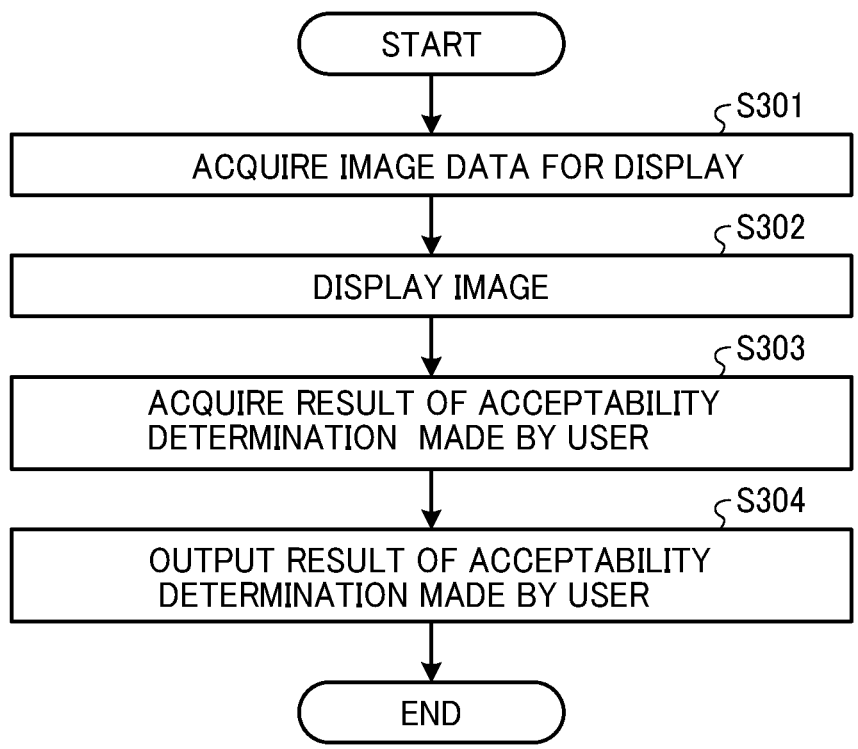
FIG. 10 is a flowchart of a pseudo defect image di splay process executed in an image forming system according to an embodiment.

Referring now to FIGS. 8 to 10, a description is given of some examples of operation of the image forming system 1 including the image inspecting apparatus 6 according to an embodiment.

FIG. 8 is a flowchart of an image inspection process executed in the image inspecting apparatus 6 according to an embodiment.

The flow illustrated in FIG. 8 is executed in a state in which the document image data, the area information, and the sample image data have been acquired by the document image information acquiring unit 601.

In step S101, the read image acquiring unit 602 acquires, as a scanned image data, data of a read image of a printed matter from the print engine 5 of the image forming apparatus 3. Here, the printed matter is a document image formed and output according to document image data on a recording medium by the image forming apparatus 3. The scanned image data thus acquired is supplied to the image inspecting unit 603.

In step S102, the image inspecting unit 603 generates a difference image of the scanned image and a sample image, based on the scanned image data and sample image data. In step S103, the image inspecting unit 603 performs image inspection with the difference image. Specifically, the image inspecting unit 603 compares each value of pixels constructing the difference image (i.e., difference value of each pixel) with a preset threshold for image inspection. When a defect (i.e., a printing error) is detected, the image inspecting unit 603 acquires information of the detected defect and evaluates the detected defect.

When the printing error is detected in the image inspection (YES in step S104), in step S105, the image inspection control unit 604 executes a pseudo defect image generation process to generate pseudo defect image data.

FIG. 9 is a flowchart of the pseudo defect image generation process executed in the image inspecting apparatus 6 according to an embodiment.

In step S201, the relocation defect determining unit 604a determines (or selects) a defect having a high defect score as a defect to be relocated. In step S202, the relocation position determining unit 604b determines a relocation position of the selected defect for each area on the document image. In step S203, the pseudo defect image generating unit 604c moves the defect to be relocated to the relocation position to generate, as pseudo defect difference image data, image data representing a pseudo defect difference image. In step S204, the pseudo defect image generating unit 604c adds (or superimposes) the generated pseudo defect difference image to an image such as the document image or the sample image to generate, as pseudo defect image data, image data representing a pseudo defect image. Thus, the flow of FIG. 9 is completed.

Referring back to FIG. 8, in step S106, the image inspection control unit 604 outputs image data for display, that is, the generated pseudo defect image data representing the pseudo defect image. Alternatively, the image inspection control unit 604 may output, as the image data for display, the document image data, the scanned image data, or the sample image data. In step S107, the image inspection control unit 604 executes acceptability determination of the scanned image, based on a result of operation by a user with the operation device 72 in response to the display of, e.g., the pseudo defect image, that is, based on a result of acceptability determination made by the user.

When the result of acceptability determination is "acceptable," that is, when the user determines that the detected defect is acceptable (YES in step S108), in step S109, the image inspection control unit 604 changes (or updates) a threshold related to the defect detection. As a result, defects similar to the defects detected in the present processing are not detected as printing errors in the subsequent inspections. That is, even when defects similar to the defects determined as acceptable occur later, printing does not stop, thus enhancing the productivity. Thus, the flow of FIG. 8 is completed.

By contrast, when no printing error is detected in the image inspection (NO in step S104) and when the result of acceptability determination is "unacceptable" (NO in step S108), the flow of FIG. 8 is completed. Therefore, the image inspection control unit 604 according to the present embodiment does not change the threshold related to the defect detection when the result of acceptability determination is "unacceptable," that is, when the user determines that the detected defect is unacceptable. As a result, defects similar to the defects detected in the present processing are detected as printing errors in the subsequent inspections.

FIG. 10 is a flowchart of a pseudo defect image display process executed in the image forming system 1 according to an embodiment.

In step S301, the LCD 71 acquires the image data for display such as the pseudo defect image data output from the image inspection control unit 604 in S106. In step S302, the LCD 71 displays an image such as a pseudo defect image according to the acquired image data for display. In step S303, the operation device 72 acquires a result of operation by the user in response to the display of an image such as the pseudo defect image, that is, a result of acceptability determination made by the user. In step S304, the operation device 72 outputs the acquired result of operation, that is, the acquired result of determination. The output result of operation is acquired by the image inspection control unit 604 as a result of acceptability determination.

Typically, an image failure similar to a detected image failure may occur in an area different from an area in which the detected image failure exists, after a threshold related to detection of image failures is changed. The allowable degree of image failure, that is, the quality required by a user may be different between areas on an image having an image failure. For this reason, an image failure that fails to satisfy the quality required by the user may occur after the threshold related to detection of image failures is changed.

For example, in a case in which a defect occurs due to a scratch on a drum-shaped photoconductor or a transfer belt, the position of a pixel having a defect may change each time the printing is executed. Specifically, for example, in an image including a text area and a picture area, a defect similar to a defect generated in the text area may occur in the picture area. For this reason, for example, a user who places more importance on the quality of a picture area than on the quality of a text area has some difficulties in determining whether the degree of defect is acceptable until a defect occurs in the picture area. Alternatively, in a case in which the user determines that a defect generated in the text area is acceptable, the threshold for defect detection is loosened. Therefore, even when a defect similar to the defect generated in the text area occurs in the picture area thereafter, the defect is not detected as an image failure. As a result, the printing is continued. In this case, the user may find, after the printing is completed, that the defect generated in the picture area is not acceptable and restart the printing. In a case in which the user misses an unacceptable defect in the picture area, a printed matter including the unacceptable defect may be distributed to the next process.

To address such a situation, as described above, the image inspecting apparatus 6 according to the present embodiment determines whether a document image has a printing error, based on a result of comparison of scanned image data and sample image data. In a case in which the image inspecting apparatus 6 determines that the document image has a printing error, the image inspecting apparatus 6 relocates the printing error and generates the image data for display, as display image data, representing a pseudo defect image having the position of the printing error changed. Such display image data allows a user to determine whether the defect is acceptable when a similar defect occurs in another area or in another place within the area in which the printing error is generated. Thus, according to the present embodiment, the image inspecting apparatus 6 provides a material for determining whether to change a threshold after the acceptability determination with respect to the image quality, thus enhancing the accuracy of determination as to whether to change the threshold, even in a case in which a user requires different qualities between areas on the image. In other words, the image inspecting apparatus 6 according to the present embodiment allows an appropriate change of the threshold related to detection of image failure.

Note that, in the embodiment described above, the image forming apparatus 3 has been described as a multifunction peripheral (MFP) having at least two of copying, printing, scanning, and facsimile functions. Alternatively, an image forming apparatus of one or more embodiments may be, e.g., a copier, a printer, a scanner, or a facsimile machine.

According to the embodiments of the present disclosure, a threshold related to detection of image failures is changed as appropriate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image inspecting apparatus comprising circuitry configured to:
   determine, based on a result of comparison of scanned image data and sample image data, whether an image indicated by the scanned image data has a printing error, the scanned image data being generated from a document image formed and output according to document image data on a recording medium and read, the sample image data corresponding to the document image data; and
   generate display image data representing a pseudo defect image having the printing error added to a position different from a position of the printing error in the image indicated by the scanned image data, in response to determination that the image indicated by the scanned image data has the printing error.

2. The image inspecting apparatus according to claim 1, wherein the circuitry is configured to:
   compare a difference value of each pixel included in the result of comparison with a threshold for image inspection to acquire a difference value and a position for each of pixels having the printing error;
   group the pixels having the printing error according to the position to specify a defect image included in the printing error; and calculate a type of the defect image and a defect score indicating a degree of defect of the defect image, based on a feature of the specified defect image.

3. The image inspecting apparatus according to claim 2, wherein the circuitry is configured to select, as a printing error to be added to the pseudo defect image, a defect image having the calculated defect score as maximum from defect images included in the printing error.

4. The image inspecting apparatus according to claim 3, wherein the circuitry is configured to select the defect image to be added to the pseudo defect image for each type of the defect image.

5. The image inspecting apparatus according to claim 1, wherein the circuitry is configured to acquire, from an outside, the document image data and area information that is used to identify areas on the document image.

6. The image inspecting apparatus according to claim 5, wherein the circuitry is configured to retain the acquired area information.

7. The image inspecting apparatus according to claim 5, wherein the circuitry is configured to acquire the area information from the document image data by area segmentation in a case in which the circuitry fails to acquire the area information.

8. The image inspecting apparatus according to claim 1, wherein circuitry is configured to add the printing error to an area different from an area in which the printing error exists in the image indicated by the scanned image data, based on area information that is used to identify areas on the document image.

9. The image inspecting apparatus according to claim 1, wherein circuitry is configured to determine a position to which the printing error is added in an area on the pseudo defect image, based on at least one of a position of the printing error in the image indicated by the scanned image data, a position of a pixel having the printing error, and a difference value of the pixel having the printing error.

10. The image inspecting apparatus according to claim 1, wherein the circuitry is configured to determine a position to which the printing error is added in an area on the pseudo defect image provided that the area includes a maximum number of pixels having the printing error.

11. The image inspecting apparatus according to claim 1, wherein the circuitry is configured to determine a position to which the printing error is added in an area on the pseudo defect image at a preset position.

12. The image inspecting apparatus according to claim 1, wherein the circuitry is configured to:
use the document image data as the sample image data in a case in which a difference in resolution between the scanned image data and the document image data is equal to or less than a threshold; and
convert a resolution of the document image data according to a resolution of the scanned image data to use the document image data having the resolution converted as the sample image data in a case in which the difference in resolution between the scanned image data and the document image data is greater than the threshold.

13. The image inspecting apparatus according to claim 1, wherein the circuitry is configured to add the printing error to an image indicated by one of the scanned image data, the sample image data, and the document image data to generate the display image data.

14. The image inspecting apparatus according to claim 1, wherein the circuitry is configured to execute, in a case in which a difference between a resolution of a difference image indicating a difference between the scanned image data and the sample image data included in the result of comparison and a resolution of an image to which the printing error is added is greater than a threshold, image processing to change the resolution of one of the difference image and the image to which the printing error is added.

15. The image inspecting apparatus according to claim 1, wherein the circuitry is configured to relax and update a threshold for image inspection to be compared with a difference value of each pixel included in the result of comparison in a case in which the printing error is determined acceptable in response to a display of the pseudo defect image.

16. The image inspecting apparatus according to claim 1, further comprising a display configured to display the pseudo defect image according to the display image data.

17. A display method comprising:
determining, based on a result of comparison of scanned image data and sample image data, whether an image indicated by the scanned image data has a printing error, the scanned image data being generated from a document image formed and output according to document image data on a recording medium and read, the sample image data corresponding to the document image data;
generating display image data representing a pseudo defect image having the printing error added to a position different from a position of the printing error in the image indicated by the scanned image data, in response to determination that the image indicated by the scanned image data has the printing error; and
displaying the pseudo defect image according to the display image data.

18. A non-transitory, computer-readable storage medium storing computer-readable program code that causes a computer to perform a display method, the method comprising:
determining, based on a result of comparison of scanned image data and sample image data, whether an image indicated by the scanned image data has a printing error, the scanned image data being generated from a document image formed and output according to document image data on a recording medium and read, the sample image data corresponding to the document image data;
generating display image data representing a pseudo defect image having the printing error added to a position different from a position of the printing error in the image indicated by the scanned image data, in response to determination that the image indicated by the scanned image data has the printing error; and
displaying the pseudo defect image according to the display image data.

* * * * *